US011891146B2

(12) United States Patent
Santurbane et al.

(10) Patent No.: US 11,891,146 B2
(45) Date of Patent: Feb. 6, 2024

(54) BICYCLE SUSPENSION COMPONENTS AND ELECTRONIC MONITORING DEVICES

(71) Applicant: SRAM, LLC, Chicago, IL (US)

(72) Inventors: Mark Santurbane, Colorado Springs, CO (US); Brian Jordan, Highland Park, IL (US); Kevin Wesling, Lombard, IL (US)

(73) Assignee: SRAM, LLC, Chicago, IL (US)

(*) Notice: Subject to any disclaimer, the term of this patent is extended or adjusted under 35 U.S.C. 154(b) by 618 days.

(21) Appl. No.: 16/717,657

(22) Filed: Dec. 17, 2019

(65) Prior Publication Data

US 2021/0179222 A1    Jun. 17, 2021

(51) Int. Cl.
*B62J 45/42* (2020.01)
*B62J 45/41* (2020.01)
*B62K 25/02* (2006.01)
*B62J 43/30* (2020.01)

(52) U.S. Cl.
CPC ............... *B62J 45/42* (2020.02); *B62J 43/30* (2020.02); *B62J 45/41* (2020.02); *B62K 25/02* (2013.01); *B62K 2201/08* (2013.01)

(58) Field of Classification Search
None
See application file for complete search history.

(56) References Cited

U.S. PATENT DOCUMENTS

| | | | |
|---|---|---|---|
| 5,825,665 A * | 10/1998 | Swift | B62J 45/423 33/355 R |
| 6,600,411 B2 | 7/2003 | Nishimoto | |
| 8,825,322 B1 | 9/2014 | Ikemoto et al. | |
| 2008/0164674 A1 * | 7/2008 | Chen | B62J 6/03 280/280 |
| 2011/0005387 A1 | 1/2011 | Ehre et al. | |
| 2011/0202236 A1 | 8/2011 | Galasso et al. | |
| 2012/0136537 A1 | 5/2012 | Galasso et al. | |
| 2013/0134688 A1 | 5/2013 | Mochizuki et al. | |
| 2013/0320647 A1 | 12/2013 | Awasa | |
| 2014/0095015 A1 | 4/2014 | Nieten et al. | |

(Continued)

FOREIGN PATENT DOCUMENTS

| | | |
|---|---|---|
| CN | 13274724 | 10/2002 |
| CN | 200992279 Y | 12/2007 |

(Continued)

OTHER PUBLICATIONS

Overholt, Zach, "Hayes / Manitou Test Sessions: Using high tech data acquisition to develop next level product", Bikerumor, Apr. 11, 2017, 19 pages, https://bikerumor.com/2017/04/11/hayes-manitou-test-sessions-using-high-tech-data-acquisition-to-develop-next-level-product/?utm_source=fee%E2%80%A6.

*Primary Examiner* — Daniel L Greene

(57) ABSTRACT

Example bicycle suspension components and electronic monitoring devices are described herein. An example electronic monitoring device includes a housing defining a chamber. The housing is to be coupled to a suspension component. The electronic monitoring device includes a circuit board disposed in the chamber and a sensor electrically coupled to the circuit board. The sensor is to measure a characteristic of the suspension component. The electronic monitoring device also includes a battery holder coupled to the circuit board.

20 Claims, 9 Drawing Sheets

(56) References Cited

U.S. PATENT DOCUMENTS

| | | | |
|---|---|---|---|
| 2015/0197308 A1* | 7/2015 | Butora | B62K 25/20 |
| | | | 280/283 |
| 2015/0369328 A1 | 12/2015 | Sautier et al. | |
| 2018/0304952 A1* | 10/2018 | Krugman | B62K 25/08 |
| 2019/0016409 A1* | 1/2019 | Tetsuka | B62M 6/50 |
| 2019/0092116 A1* | 3/2019 | Magnus | B62K 25/30 |
| 2019/0092421 A1* | 3/2019 | Nichols | F16F 9/185 |
| 2021/0061405 A1* | 3/2021 | Ericksen | B60G 21/08 |

FOREIGN PATENT DOCUMENTS

| | | |
|---|---|---|
| CN | 106103260 A | 11/2016 |
| EP | 2357098 | 10/2014 |
| EP | 2939857 A2 | 11/2015 |
| EP | 3121103 A1 | 1/2017 |
| TW | 200942443 A | 10/2009 |
| TW | I351365 | 11/2011 |
| TW | 201919942 | 6/2019 |

\* cited by examiner

BICYCLE SUSPENSION COMPONENTS AND ELECTRONIC MONITORING DEVICES

FIELD OF THE DISCLOSURE

This disclosure relates generally to bicycle components and, more specifically, to bicycle suspension components and electronic monitoring devices.

BACKGROUND

Bicycles and other vehicles are known to have suspension components to improve vehicle ride and performance. Suspension components are used for various applications, such as cushioning impacts, vibrations, or other disturbances experienced by the bicycle during use. A common application for suspension components on bicycles is for cushioning impacts or vibrations experienced by the rider when the bicycle is ridden over bumps, ruts, rocks, pot holes, and/or other obstacles. These suspension components include rear and/or front wheel suspension components. Suspension components may also be used in other locations, such as a seat post or handlebar, to insulate the rider from impacts.

SUMMARY

An example electronic monitoring device for a suspension component of a bicycle is disclosed herein. The electronic monitoring device includes a housing defining a chamber. The housing is to be coupled to the suspension component. The electronic monitoring device includes a circuit board disposed in the chamber and a sensor electrically coupled to the circuit board. The sensor is to measure a characteristic of the suspension component. The electronic monitoring device also includes a battery holder coupled to the circuit board.

An example electronic monitoring device for a suspension component of a bicycle is disclosed herein. The electronic monitoring device includes a housing to be coupled to the suspension component. A passageway is defined through the housing. The electronic monitoring device also includes a circuit board disposed in the housing and a sensor electrically coupled to the circuit board. The sensor is to measure a characteristic of the suspension component. The electronic monitoring device further includes a valve disposed in the passageway to control a flow of fluid into or out of the suspension component. The valve is aligned along an axis that is offset from a central axis of the housing.

An example suspension component for a bicycle disclosed herein includes a first tube and a second tube configured in a telescopic arrangement. The first tube has an opening formed in an end of the first tube. The suspension component also includes a spring including a pneumatic chamber defined in the first tube and containing a mass of a pneumatic fluid configured to resist compression of the telescopic arrangement. The suspension component further includes an electronic monitoring device disposed in the opening. The electronic monitoring device includes a housing, a circuit board disposed in the housing, a sensor electrically coupled to the circuit board, the sensor to measure a characteristic of the spring, and a wireless communicator coupled to the circuit board. The wireless communicator is at least partially disposed on an opposite side of a plane defined by the end of the first tube relative to the sensor.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
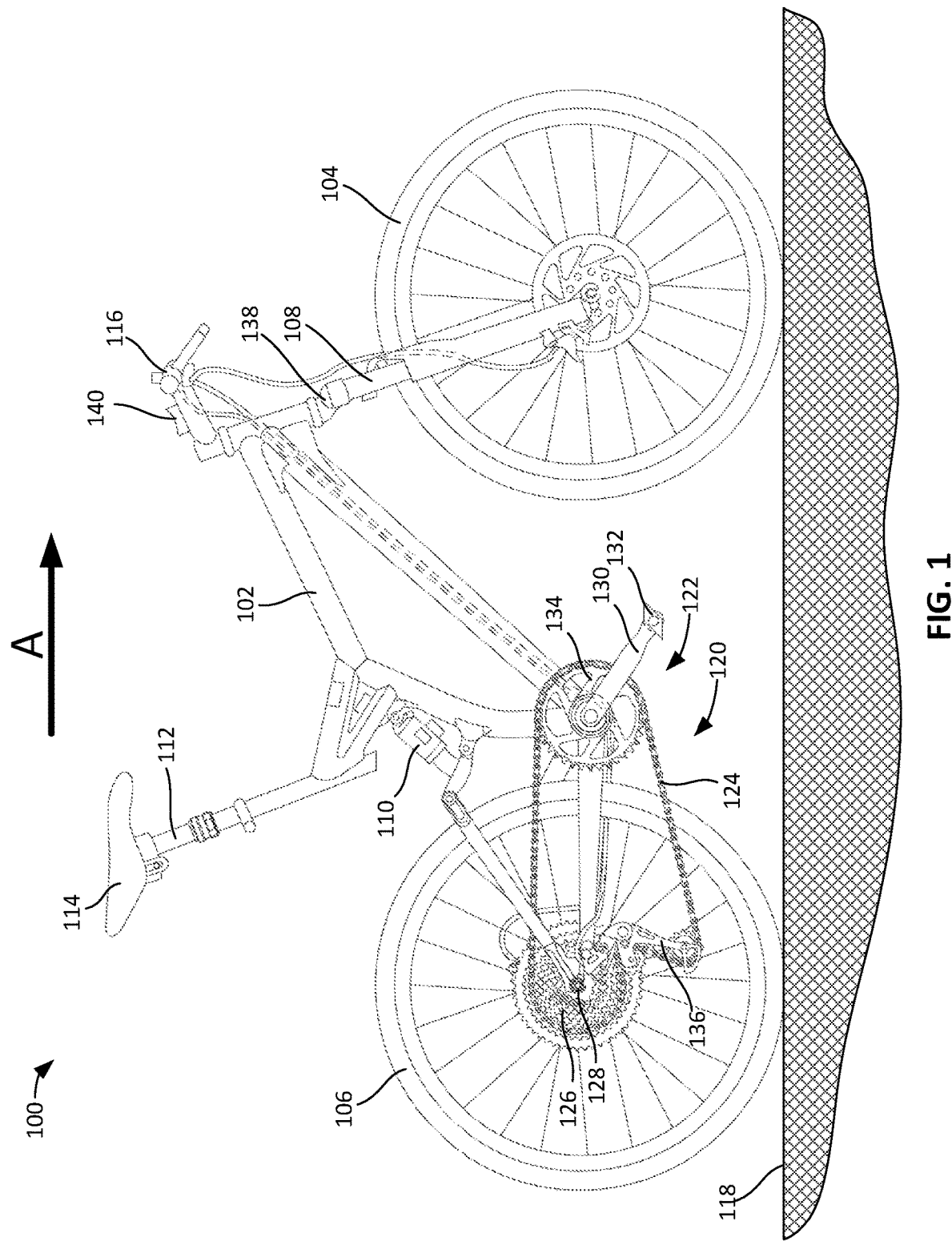
FIG. 1 is a side view of an example bicycle that may employ an example suspension component and an example electronic monitoring device constructed in accordance with the teachings of this disclosure.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example suspension components and example electronic monitoring devices for use with suspension components. The example suspension components and example electronic monitoring devices disclosed herein may be used in connection with a bicycle, for example. The example electronic monitoring devices disclosed herein may be at least partially integrated with a suspension component and used to analyze and/or otherwise measure or qualify one or more variables and/or characteristics of the associated suspension component. The electronic monitoring devices include one or more characteristic measurement devices, such as a sensor, to measure or detect the characteristic(s) of the suspension component(s). By measuring and/or analyzing the characteristic(s), information about the suspension component and a rider's style can be provided to the rider.

This information can also be used to adjust or tune the suspension component for improved performance. For example, on a bicycle, rider weight, riding style, and terrain greatly affect the performance of the suspension system. The performance of a suspension system may be represented by a suspension component's position and/or configuration versus time. This position and/or configuration may be characterized by a linear motion or position variable of the component. In some examples, an electronic monitoring device is used to measure a characteristic (e.g., a gas pressure) of a suspension component, which can be correlated to the position variable (e.g., via the ideal gas law). Once the motion or position variable is measured, other information can be derived, such as velocity, acceleration, position histograms, etc. By extension, direct measurement of other variables, such as velocity or acceleration, can be used to derive the position of the suspension versus time. Once the position over time is measured and/or derived, information can be provided that can aid a user in adjusting various settings of the suspension system to improve the performance of the system. In many cases, the suspension system includes settings that can be adjusted to the individual rider's need and environment. These adjustable settings may include, for example, air pressure, compression ratio, low speed compression damping, high speed compression damping, low speed rebound damping, high speed rebound damping, and/or other suspension settings.

An example suspension component disclosed herein is a front fork on a bicycle. The front fork includes a first tube (an upper leg) and a second tube (a lower leg) configured in a telescoping arrangement. The front fork includes an air spring defined by a pressurized pneumatic chamber within the first tube. The pneumatic chamber is filled with a mass of pressurized pneumatic fluid (e.g., air) that resists compression of the first and second tubes, and thereby provides cushioning for impacts and vibrations.

An example electronic monitoring device disclosed herein can be disposed in an opening formed in an end of the first tube. The electronic monitoring device seals the opening and is exposed to the pressurized pneumatic fluid in the pneumatic chamber in the first tube. The example electronic monitoring device includes a housing that may be threadably coupled (e.g., screwed into) to the first tube. The housing defines a chamber in which a circuit board and a power supply, such as a battery, are disposed. The electronic monitoring device may include one or more sensors electrically coupled to the circuit board. The sensor(s) is/are used to measure one or more characteristics or parameters of the suspension component. For example, one of the sensors may be a pressure sensor that measures a pressure of the pressurized pneumatic fluid in the pneumatic chamber. In some examples, having the circuit board and the battery in the same chamber enables the use of a smaller housing compared to a housing having separate chambers for the circuit board and the battery. This results in a smaller, lighter, and more aesthetically pleasing package. In some examples, the battery is disposed within a battery holder that is coupled to the circuit board. This reduces the overall volume consumed by the circuit board and the battery and, thus, also helps reduce the size of the electronic monitoring device.

In some examples, the electronic monitoring device includes a valve (e.g., a Schrader valve or a Presta valve) disposed in a passageway extending through the housing. The valve is used to control a flow of fluid into or out of the suspension component. For example, the valve can be used to add or remove fluid from the pneumatic chamber without removing the electronic monitoring device from the suspension component. In some examples, the passageway and the valve are aligned along an axis that is parallel to and offset from a central axis of the housing (which is aligned with the longitudinal axis of the first tube). In other words, the axis of the valve and the passageway is not coincident with the central axis of the housing and the longitudinal axis of the first tube. This enables the chamber to positioned closer to or along the central axis of the housing, which is the widest part of the housing. As such, the chamber can be sized larger (e.g., wider) to accommodate the circuit board, the battery, and/or other components (e.g., brackets, sensors, etc.). Further, the circuit board can be sized wider with a smaller height relative to known devices. Thus, the housing can be sized shorter than known devices, which results in a smaller, lighter, and more aesthetically pleasing package.

In some examples, the electronic monitoring device includes a wireless antenna or communicator. The wireless communicator may be coupled and/or otherwise disposed on the circuit board. In some examples, when the electronic monitoring device is disposed in the opening of the first tube, the wireless communicator is disposed at least partially above a plane of an end of the tube defining the opening. In other words, the wireless communicator is disposed on a side of the plane that is opposite the sensor in the pneumatic chamber. This reduces the amount of obstruction and interference caused by the first tube. Thus, the example electronic monitoring device has improved signal range compared to known devices in which the wireless communicator is disposed below the plane of the end of the tube.

Also disclosed herein are example adjustment devices that can be used to change (increase or decrease) a volume of the pneumatic chamber to achieve specific air spring performance. An example adjustment device may be coupled to the housing of the electronic monitoring device, such that when the electronic monitoring device is coupled to the suspension component, the adjustment device is disposed in the pneumatic chamber, which reduces the overall volume of the pneumatic chamber. In some examples, the adjustment device is interchangeable with a larger or smaller adjustment device. In some examples, multiple adjustment devices may be coupled to the housing.

Turning now to the figures, FIG. 1 illustrates one example of a human powered vehicle on which the example suspension components and the example electronic monitoring devices disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a first or front suspension component, such as a front fork 108, and supports the front end of the frame 102. The rear wheel 106 is coupled to the rear end of the frame 102, and may be supported by a second or rear suspension component, such as a rear shock 110. A front and/or forward riding direction or orientation of the bicycle 100 is indicated by the direction of the arrow A in FIG. 1. As such, a forward direction of movement for the bicycle 100 is indicated by the direction of arrow A.

The front fork 108 and the rear shock 110 form a suspension system of the bicycle 100 to absorb shocks while riding the bicycle 100 (e.g., when riding over rougher terrain). In other examples, the suspension system may employ only one suspension component (e.g., only the front fork 108) or more than two suspension components (e.g., an additional suspension component on a seat post 112) in addition to or as an alternative to the front fork 108 and the rear shock 110.

In the illustrated example of FIG. 1, the bicycle 100 includes a seat 114 coupled to the frame 102 (e.g., near the rear end of the frame 102 relative to the forward direction A) via the seat post 112. The bicycle 100 also includes handlebars 116 coupled to the frame 102 and the front fork 108 (e.g., near a forward end of the frame 102 relative to the forward direction A) for steering the bicycle 100. The bicycle 100 is shown on a riding surface 118. The riding surface 118 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 120 that includes a crank assembly 122. The crank assembly 122 is operatively coupled via a chain 124 to a sprocket assembly 126 mounted to a hub 128 of the rear wheel 106. The crank assembly 122 includes at least one, and typically two, crank arms 130 and pedals 132, along with at least one front sprocket, or chainring 134. A rear gear change device 136, such as a derailleur, is disposed at the rear wheel 106 to move the chain 124 through different sprockets of the sprocket assembly 126. Additionally or alternatively, the bicycle 100 may include a front gear change device to move the chain 124 through gears on the chainring 134.

In the illustrated example, the front fork 108 includes an example electronic monitoring device 138 (which may also be referred to as a suspension component analysis (SCA) device, a sensing device, or a detection device) that is integrated with the front fork 108. The electronic monitoring device 138 is used to measure or otherwise qualify one or more characteristics and/or other variables of the front fork 108. The rear shock 110 may also an electronic monitoring device. Electronic monitoring devices may also be associated with other suspension components, such as the seat post 112.

In some examples, the bicycle 100 includes a mobile device 140 that can communicate with the one or more electronic monitoring devices 138 to provide an interface between the electronic monitoring device(s) 138 and the user. The electronic monitoring device(s) 138 can wirelessly transmit the measured characteristics to the mobile device 140. In other examples, the bicycle 100 may include one or more wired connections (e.g., wires, cables, etc.) to communicatively couple the electronic monitoring device(s) 138 and the mobile device 140. The mobile device 140 can include a display to present the measured characteristics to a user (e.g., a rider). In some examples, the mobile device 140 has a user interface (e.g., buttons, a touch screen, etc.) to receive input commands from a user. In some examples, the mobile device 140 can perform further analysis using the measured characteristics to provide other information relating to the performance of one or more suspension components. Additionally or alternatively, the mobile device 140 can be provided to control one or more components of the bicycle 100, such as the front fork 108. In one example, the mobile device 140 is a device distinct from the bicycle 100, such as a handheld mobile computing device, a smartphone, or other computer. Multiple mobile devices may also be used.

As disclosed above, various characteristic(s) of a suspension component may be measured and used to determine performance of a suspension component. In some examples, gas pressure is measured. For example, an electronic monitoring device can include a sensor operative to measure a gas pressure in a suspension component to calculate the suspension displacement and/or a derivative thereof. The electronic monitoring device may be implemented to measure the pressure (gage pressure or absolute pressure) of a mass of gas within a bicycle suspension component. The gas may be contained in a particular volume or chamber of the suspension component. In some examples, the electronic monitoring device includes a pressure sensor, such as an electro-mechanical pressure sensor, to convert a measured gas pressure into an electrical signal through a piezo-resistive or other effect. This signal can then be analyzed (e.g., via the mobile device 140) to determine the change of pressure within the suspension component and/or the measured volume or chamber. This change in pressure is directly related to the displacement of system components, with the displacement being derivable through fluid dynamics calculations such as the ideal gas law. In some examples, the derived values are generated with additional considerations for the derivation, including compensation for diabatic and other external effects that may limit the assumptions required for ideal gas law calculations.

While the example bicycle 100 depicted in FIG. 1 is a type of mountain bicycle, the example suspension components and example electronic monitoring devices disclosed herein can be implemented on other types of bicycles. For example, the disclosed suspension components and electronic monitoring devices may be used on road bicycles, as well as bicycles with mechanical (e.g., cable, hydraulic, pneumatic, etc.) and non-mechanical (e.g., wired, wireless) drive systems. The disclosed suspension components and electronic monitoring devices may also be implemented on other types of two-, three-, and four-wheeled human powered vehicles. Further, the example suspension components and electronic monitoring devices can be used on other types of vehicles, such as motorized vehicles (e.g., a motorcycle, a car, a truck, etc.).

Figure 2:
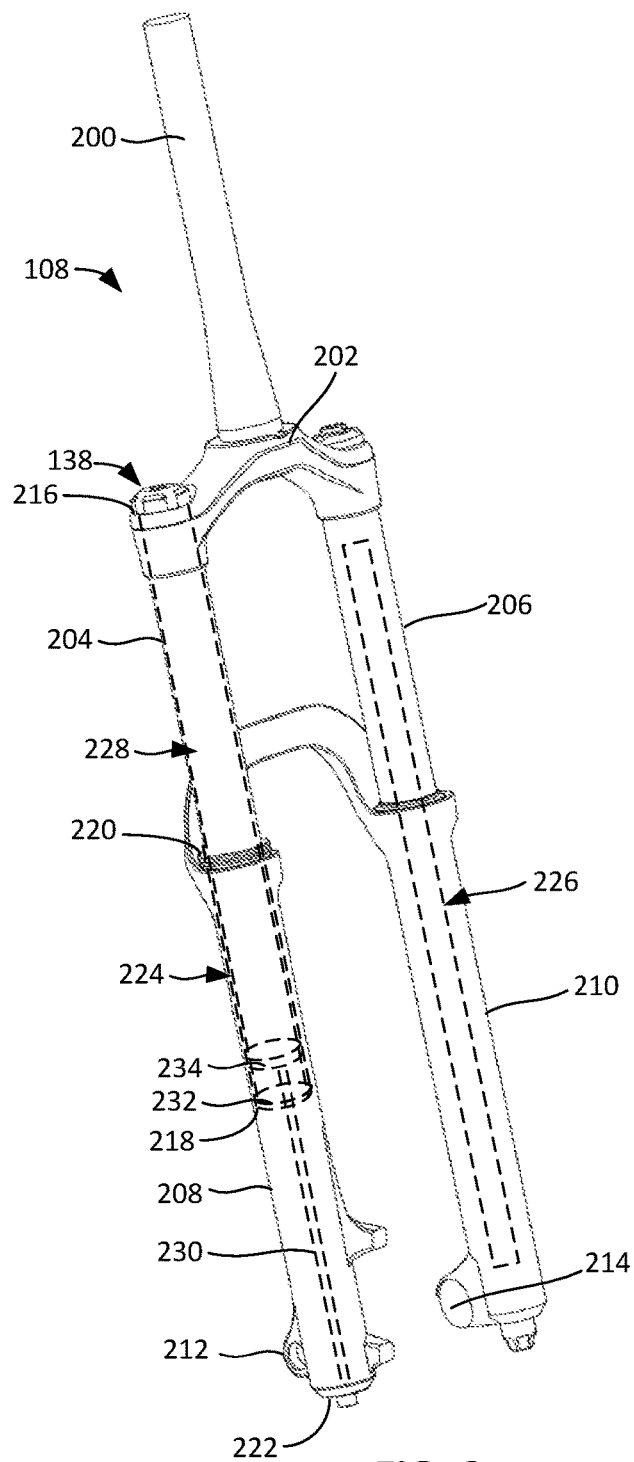
FIG. 2 is a perspective view of an example front fork (a suspension component) and an example electronic monitoring device that may be implemented with the example front fork on the example bicycle of FIG. 1.
Figure 3:
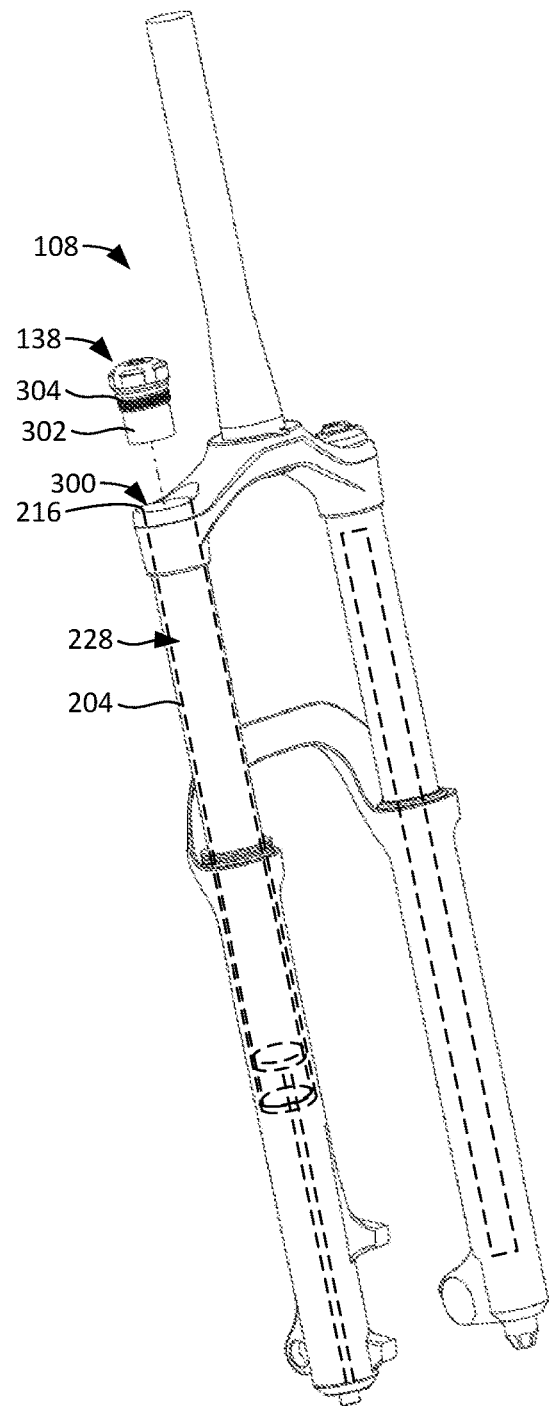
FIG. 3 shows the example electronic monitoring device as separated from the example front fork.

FIG. 2 is a perspective view of the example front fork 108 of the example bicycle 100 (FIG. 1) with the example electronic monitoring device 138 coupled to the front fork 108, and FIG. 3 is another perspective view of the example front fork 108 showing the electronic monitoring device 138 as separated from the front fork 108. Some of the internal components of the front fork 108 are shown in dashed lines in FIGS. 2 and 3.

As shown in FIG. 2, the front fork 108 includes a steering tube 200, a crown 202, first and second upper legs 204, 206 (also referred to as inner legs, tubes, or stanchions), and first and second lower legs 208, 210 (also referred to as sliders or tubes). The steering tube 200 couples to the frame 102 (FIG. 1) and the handlebars 116 (FIG. 1). The first and second upper legs 204, 206 are slidably received within the respective first and second lower legs 208, 210. Thus, the first and second upper legs 204, 206 form a telescopic arrangement with the respective first and second lower legs 208, 210. The first and second lower legs 208, 210 include respective front wheel attachment portions 212, 214, such as holes (e.g., eyelets) or dropouts, for attaching the front wheel 104 (FIG. 1) to the front fork 108.

In the illustrated example, the first upper leg 204 has a first end 216, referred to herein as a top end 216, and a second end 218, referred to herein as a bottom end 218, opposite the top end 216. Similarly, the first lower leg 208 has a first end 220, referred to herein as a top end 220, and a second end 222, referred to herein as a bottom end 222, opposite the top end 220. The top end 216 of the first upper leg 204 is disposed within the first lower leg 208. The top end 216 of the first upper leg 204 and the bottom end 222 of the first lower leg 208 form first and second distal ends of the suspension component. During compression, the top end 216 (the first distal end) moves toward the bottom end 222 (the second distal end), and during extension or rebound, the top end 216 moves away from the bottom end 222. The second upper and lower legs 206, 210 have a similar arrangement.

The legs 204, 206, 208, 210 of the front fork 108 form a suspension system. The suspension system includes both a spring 224 and a damper 226. In this example, the spring 224 is disposed in and/or otherwise integrated into the first upper and lower legs 204, 208, and the damper 226 is disposed in and/or otherwise integrated into the second upper and lower legs 206, 210. In particular, the spring 224 is disposed within and/or otherwise defined by an interior cavity or space of the first upper and lower legs 204, 208 bounded by the walls of the first upper and lower legs 204, 208. Similarly, the damper 226 is disposed within and/or otherwise defined by an interior space formed by the walls of the second upper and lower legs 206, 210. In other examples, the spring 224 may be disposed in and/or otherwise integrated into the second upper and lower legs 206, 210 and the damper 226 may be disposed in and/or otherwise integrated into the first upper and lower legs 204, 208. The spring 224 is configured to resist compression of the top end 216 (the first distal end) toward the bottom end 222 (the second distal end) and return the legs 204, 206, 208, 210 to the extended position after compression occurs. The damper 226 is configured to limit the speed at which the compression/extension occurs and/or otherwise absorb vibrations.

In this example, the spring 224 is implemented as an air spring formed by a pneumatic chamber 228 in the first upper leg 204. For example, as shown in FIG. 2, a stem 230 extends upward from the bottom end 222 of the first lower leg 208 and through a seal 232 in the bottom end 218 of the first upper leg 204. A piston 234 is coupled to the stem 230 and disposed within first upper leg 204. The piston 234 is slidable within the first upper leg 204. The pneumatic chamber 228 is formed in the first upper leg 204 between the piston 234 and the top end 216 of the first upper leg 204 (which is sealed by the electronic monitoring device 138). In some examples, the pneumatic chamber 228 is filled with a mass of a pneumatic fluid (e.g., a gas, such as air) having a higher pressure than ambient pressure. Therefore, in this example, the pneumatic chamber 228 forms a pressurized chamber (sometimes referred to as a highly pressurized zone or positive spring chamber). When the front fork 108 compresses and the ends of the first upper and lower legs 204, 208 move toward each other, such as when riding over a bump, the piston 234 moves toward the top end 216 of the first upper leg 204. As a result, the volume of the pneumatic chamber 228 decreases and, thus, the pressure of the fluid within the pneumatic chamber 228 increases. After the compression, the increased pressure acts to push the ends of the first upper and lower legs 204, 208 away from each other, thereby acting as a spring to return the front fork 108 to its original or riding set up. The second upper and lower legs 206, 210 similarly follow this motion. The pressure of the fluid in the pneumatic chamber 228 can be correlated to the linear displacement of the legs using the ideal gas law. Therefore, pressure values obtained by measuring the pressure in the pneumatic chamber 228 can be used to determine displacement and/or movement of the front fork 108.

In the illustrated example, the electronic monitoring device 138 is disposed in an opening 300 (FIG. 3) formed in the top end 216 of the first upper leg 204. The electronic monitoring device 138 closes or seals the opening 300 to maintain the pressurized gas in the pneumatic chamber 228. At least a portion of the electronic monitoring device 138 is disposed within the interior space of the first upper leg 204 and exposed to the fluid in the pneumatic chamber 228. The electronic monitoring device 138 includes one or more sensors for measuring a characteristic of the front fork 108, such as the pressure of the fluid in the pneumatic chamber 228. The electronic monitoring device 138 may be removably coupled to the front fork 108. As shown in FIG. 3, the electronic monitoring device 138 includes a housing 302. The housing 302 is cylindrical or tube-shaped to match the inside of the first upper leg 204. The housing 302 contains one or more components, such as a sensor, as disclosed in further detail herein. The housing 302 has external threads 304 that mate with internal threads inside of the opening 300 (shown in further detail in FIG. 7).

Figure 4:
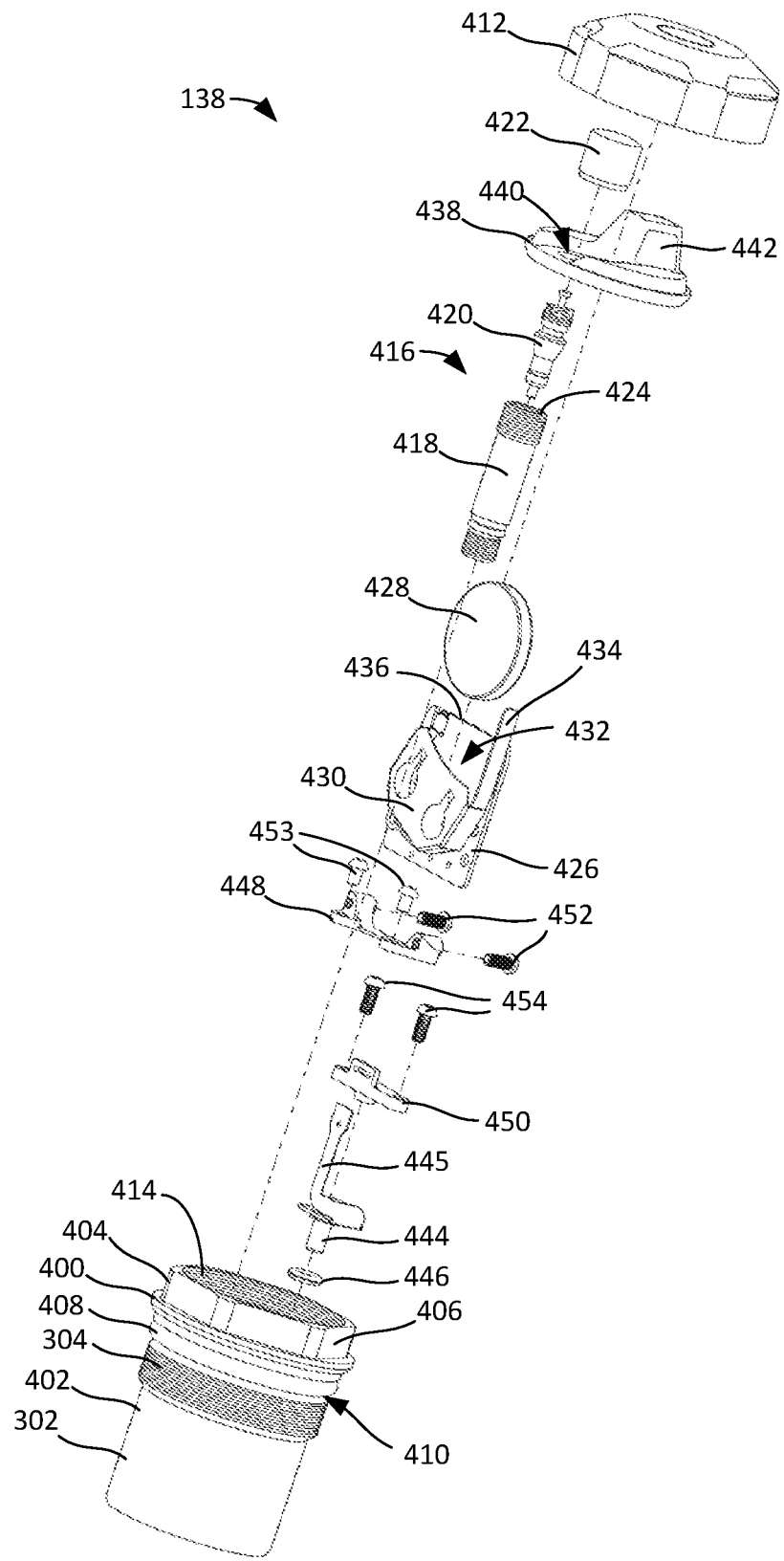
FIG. 4 is an exploded view of the example electronic monitoring device of FIG. 2.

FIG. 4 is an exploded view of the example electronic monitoring device 138. As disclosed above, the electronic monitoring device 138 includes the housing 302. The housing 302 is used to house or contain one or more components of the electronic monitoring device 138. The housing 302 has the external threads 304 that mate with the threads on the inside of the first upper leg 204 (FIG. 2) near the opening 300 (FIG. 3). In the illustrated example, the housing 302 has a shoulder 400 (e.g., a lip, a ledge, etc.) extending from an outer surface 402 of the housing 302. When the housing 302 is screwed into the opening 300 (FIG. 3), the shoulder 400 engages the top end 216 of the first upper leg 204, which provides a stop to ensure proper insertion.

In the illustrated example, the housing 302 has a wall 404 extending from an end (shown in further detail in connection with FIG. 7) of the housing 302. In the illustrated example, an outside of the wall 404 has a plurality of flat surfaces 406 (one of which is referenced in FIG. 4). The flat surfaces 406 may be used grip the housing 302 (e.g., via a tool, such as a wrench) when rotating the housing 302 for installing or uninstalling the electronic monitoring device 138. In the illustrated example, the electronic monitoring device 138 also includes a seal 408 (e.g., an o-ring) disposed in a seal gland 410 formed in the outer surface 402 of the housing 302. The seal 408 creates a sealing interface between the housing 302 and the first upper leg 204 (FIG. 2) to prevent leakage of the pneumatic fluid.

In the illustrated example, the electronic monitoring device 138 includes a cover 412 that is to be coupled to the housing 302 to cover the component(s) within the housing 302. In this example, the cover 412 is threadably coupled to the wall 404. In particular, in the illustrated example, the wall 404 has internal threads 414. The cover 412 has a wall with external threads (shown in further detail in connection with FIG. 7) that mates with the internal threads 414 on the wall 404.

To enable a user to add or remove pneumatic fluid to/from the pneumatic chamber 228 (FIG. 2), the electronic monitoring device 138 includes a valve 416. In this example, the valve 416 is implemented as a Schrader valve. However, in other examples, the valve 416 may be implemented as another type of valve, such as a Presta valve. The valve 416 includes a valve body 418 (sometimes referred to as a stem) and a core 420 (e.g., a poppet valve) that controls the flow of fluid through the valve body 418. When the electronic monitoring device 138 is assembled, the valve 416 is disposed in a passageway defined the housing 302. In some examples, the valve 416 includes a valve cap 422 that can be threaded onto a top end 424 of the valve body 418.

The electronic monitoring device 138 includes circuitry configured to receive and process (e.g., interpret) the signal(s) from one or more sensors. In this example, the circuitry is implemented as a circuit board 426. The circuit board 426 includes a substrate (e.g., a board) and circuitry built on and/or contained in the substrate. The circuit board 426 may be implemented as any type of circuit board, such as a printed circuit board (PCB), a printed circuit board assembly (PCBA), or a flexible printed circuit. The circuitry may also analyze and/or condition the signals (e.g., perform AC/DC conversion, filtering, etc.). In some examples, the circuit board 426 includes a wireless transmitter to transmit signals (e.g., information representative of the measurements). An example of a wireless transmitter is shown in further detail in connection with FIG. 11. When the electronic monitoring device 138 is assembled, the circuit board 426 is disposed in a chamber formed in the housing 302. In some examples, the chamber is substantially sealed to isolate the chamber from outside air and/or the pneumatic fluid in the pneumatic chamber 228 (FIG. 2).

The electronic monitoring device 138 includes a power supply to provide power to the sensor(s), the circuit board 426, and/or any other electrical component of the electronic monitoring device 138. In the illustrated example, the electronic monitoring device 138 includes a battery 428 implemented as the power supply. In other examples, more than one battery may be used. In this example, the battery 428 is implemented as a coin cell battery (e.g., a CR2032 coin cell battery), sometimes referred to as a button cell battery or watch battery, which is a small disk-shaped battery.

In the illustrated example, the electronic monitoring device 138 includes a battery holder 430 to receive the battery 428 and interface with the terminals of the battery 428 (e.g., the flat sides of the battery 428). In this example, the battery holder 430 is a coin cell battery holder. However, in other examples, the battery holder 430 may be implemented as a different type of holder for different type of battery. The battery holder 430 includes a slot 432 (e.g., a disc-shaped slot) to receive the battery 428. When the battery 428 is disposed in the slot 432 (assuming the battery 428 is charged), the battery 428 powers the circuit board 426 and other electrical components of the electronic monitoring device 138. In this example, the battery holder 430 is coupled to the circuit board 426 (e.g., to a back side of the circuit board 426), such that when the battery 428 is disposed in the battery holder 430, the battery 428 is oriented parallel to the circuit board 426. As such, the battery 428 is disposed relatively close to the circuit board 426. This arrangement results in a smaller space consumed by the circuit board 426 and the battery 428, which enables the electronic monitoring device 138 to be sized smaller. In other examples, the battery holder 430 may be separate from the circuit board 426.

In the illustrated example, the electronic monitoring device 138 includes a release tab 434 coupled to the battery holder 430. The release tab 434 is a thin strip of material (e.g., metal) that is partially disposed along a bottom of the slot 432. The release tab 434 extends outward from the slot 432 and beyond a top edge 436 of the circuit board 426. The release tab 434 may be pulled by a user to remove the battery 428 from the battery holder 430. In other examples, a release tab may not be included.

In some examples, the electronic monitoring device 138 includes a dust seal 438. The dust seal 438 may be constructed of rubber, for example. The dust seal 438 may be disposed in the housing 302 before attaching the cover 412. The dust seal 438 may be used to provide extra covering to prevent dust and other debris from entering the chamber or other areas where the electrical components are disposed.

The dust seal 438 may be held in place via friction fit. In the illustrated example, the dust seal 438 has an opening 440. When the electronic monitoring device 138 is assembled, the valve body 418 of the valve 416 extends through the opening 440. As such, the dust seal 438 does not need to be removed to access the valve 416. In the illustrated example, the dust seal 438 has a tab 442 that can be gripped by a user when removing and inserting the dust seal 438.

The electronic monitoring device 138 may include one or more sensors to measure or detect one or more parameters or characteristics of the spring 224 (FIG. 2). In the illustrated example, the electronic monitoring device 138 includes a pressure sensor 444. The pressure sensor 444 is to be electrically coupled to the circuit board 426, such that the circuit board 426 receives signals from the pressure sensor 444. In this example, the pressure sensor 444 is electrically coupled to the circuit board 426 via a flexible printed circuit 445. When the electronic monitoring device 138 is assembled, a portion of the pressure sensor 444 extends from a bottom of the housing 302, such that the pressure sensor 444 is exposed to the pneumatic fluid and can detect a pressure of the pneumatic fluid. The electronic monitoring device 138 includes a seal 446 (e.g., an o-ring) to seal an opening through which the pressure sensor 444 extends (shown in further detail in connection with FIG. 7). In other examples, the electronic monitoring device 138 may include one or more other types of sensors in addition to or as an alternative to the pressure sensor 444.

In the illustrated example, the electronic monitoring device 138 includes a first mount or bracket 448 for coupling the circuit board 426 to the housing 302. When the electronic monitoring device 138 is assembled, the first bracket 448 is coupled to the circuit board 426 via fasteners 452 (e.g., threaded fasteners such as screws, bolts, etc.), and the first bracket 448 is coupled to the housing 302 via fasteners 453, which may be threaded fasteners. Any number of fasteners 452, 453 may be used. In other examples, the first bracket 448 may be coupled to the circuit board 426 and/or the housing 302 using other fastening techniques (e.g., friction fit, adhesives, etc.). Further, in other examples, no bracket may be used. Instead, the circuit board 426 may be coupled directly to the housing 302 (e.g., via threaded fasteners).

In the illustrated example, the electronic monitoring device 138 includes a second mount or bracket 450. When the electronic monitoring device 138 is assembled, the second bracket 450 is coupled to the housing 302 via threaded fasteners 454 (e.g., screws, bolts, etc.) over the pressure sensor 444. The second bracket 450 reacts to pressure lads on the pressure sensor 444. Any number of threaded fasteners 454 may be used. In other examples, the second bracket 450 may be coupled to the housing 302 using other fastening techniques (e.g., friction fit, adhesives, etc.).

Figure 6:
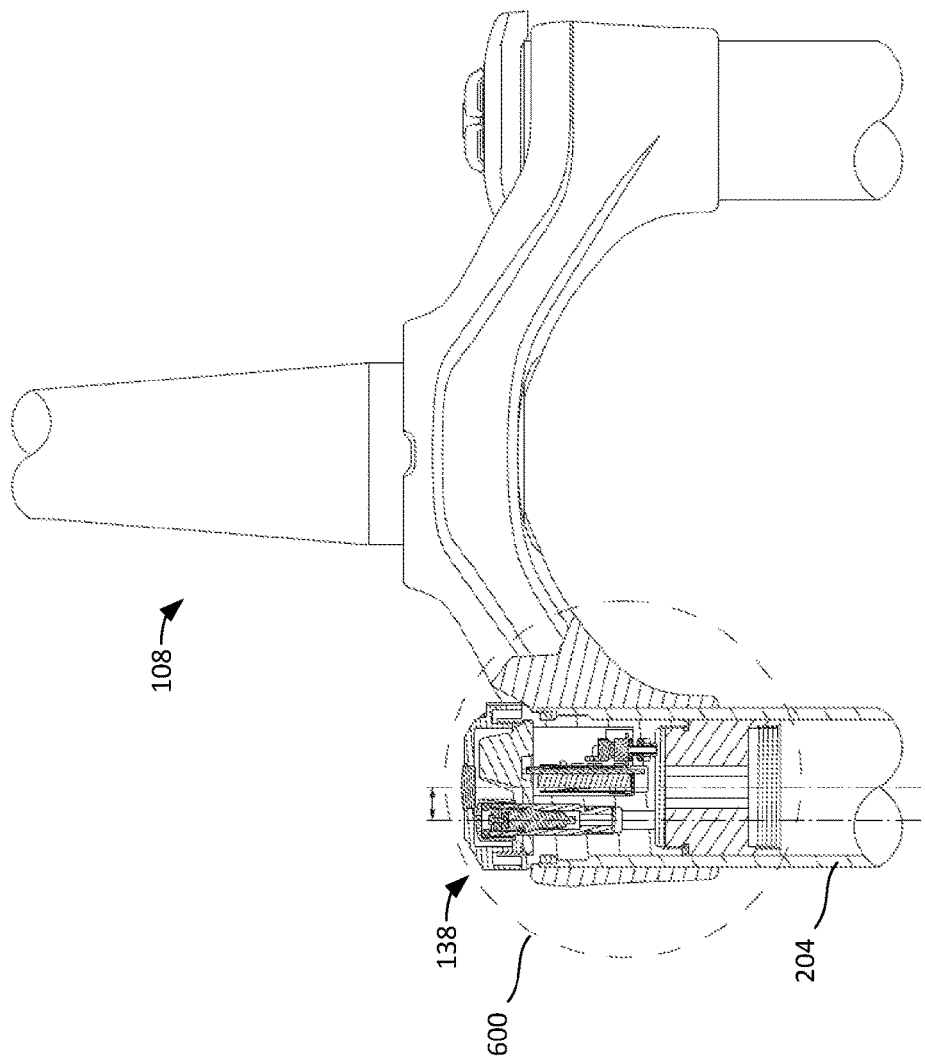
FIG. 6 is a partial cross-sectional view of the example front fork and the example electronic monitoring device of FIG. 2 taken along line A-A of FIG. 5.
Figure 5:
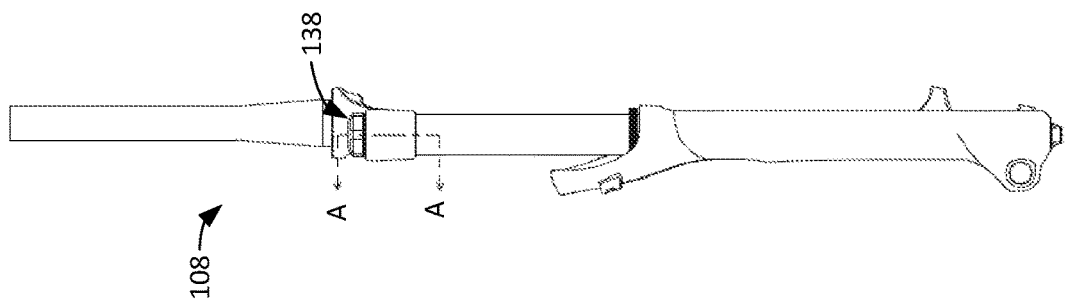
FIG. 5 is a side view of the example front fork and the example electronic monitoring device of FIG. 2.

FIG. 5 is a side view of the example front fork 108 with the example electronic monitoring device 138. FIG. 6 is a partial cross-sectional view of the example front fork 108 and the example electronic monitoring device 138 taken along line A-A of FIG. 5. As shown in FIG. 6, the electronic monitoring device 136 is nearly completely disposed in the first upper leg 204. This is advantageous over known devices that have externally mounted components, because the components in the electronic monitoring device 136 are less susceptible to damage from the environment. Further, this more aesthetically pleasing to riders.

Figure 7:
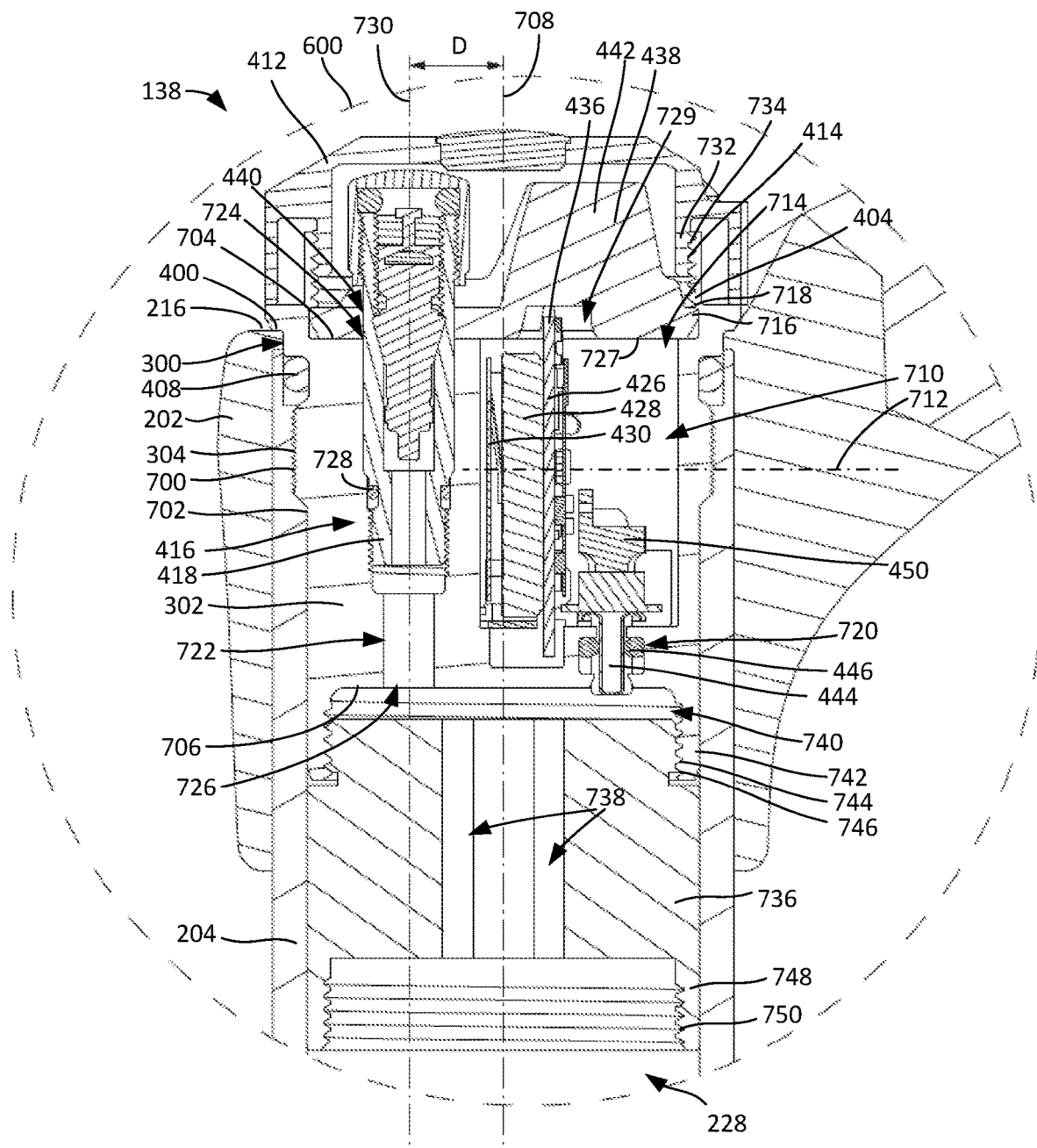
FIG. 7 is an enlarged view of the callout in FIG. 6.

FIG. 7 is an enlarged view of the callout 600 in FIG. 6. As shown in FIG. 7, the electronic monitoring device 138 is disposed in the opening 300 formed in the top end 216 of the first upper leg 204. As such, the electronic monitoring device 138 is at least partially disposed within the pressurized chamber 228 formed in the first upper leg 204. In the illustrated example, the top end 216 and the opening 300 are formed in part by the crown 202. However, it is understood that the crown 202 and the first upper leg 204 may be formed as two separated components or as one integral component and, thus, the crown 202 may form part of the first upper leg 204.

In the illustrated example, the external threads 304 on the housing 302 are threadably engaged with matching internal threads 700 on an inner surface 702 of the first upper leg 204. The housing 302 may be screwed into or out of the opening 300 to install or uninstall the electronic monitoring device 138. When the housing 302 is being screwed into the first upper leg 204, the shoulder 400 engages the top end 216, which forms a stop or seat to prevent the housing 302 from being further inserted into the opening 300. The seal 408 is compressed between the housing 302 and the inner surface 702 of the first upper leg 204, which prevents leakage of pneumatic fluid out of the pneumatic chamber 228.

In the illustrated example, the housing 302 has a first end 704 (e.g., a top end) and a second end 706 (e.g., a bottom end) opposite the first end 704. The housing 302 has a central axis 708. The central axis 708 is coincident with or the same as a longitudinal axis of the first upper leg 204. In the illustrated example, the housing 302 defines a chamber 710. In this example, the circuit board 426 and the battery 428 are disposed at least partially in the chamber 710. The circuit board 426 is coupled to the housing 302 in the chamber 710 via the first bracket 448 (FIG. 4). In the illustrated example, the circuit board 426 and the battery 428 are oriented vertically in the chamber 710. In particular, the battery 428 and the battery holder 430 are oriented such that a central axis 712 of the battery 428 and the battery holder 430 is perpendicular to the central axis 708 of the housing 302. Because the circuit board 426 and the battery 428 are disposed in the same chamber, the housing 302 can be sized smaller than known devices that have separate chambers for a circuit board and a power supply. This results in a lighter, smaller volume, less expensive device.

In the illustrated example, the chamber 710 is accessible through an opening 714 formed in the first end 704 of the housing 302. The dust seal 438 is disposed over the first end 704 of the housing 302 and covers the opening 714 to substantially seal the chamber 710, thereby protecting the circuit board 426 and other components in the chamber 710 from debris and other material. In the illustrated example, the dust seal 438 is engaged with the first end 704 of the housing 302. In other examples, the dust seal 438 may be spaced from the first end 704 of the housing 302. The dust seal 438 has a lip 716 that fits under a shoulder 718 on the housing 302 to hold the dust seal 438 in place. As disclosed above, the dust seal 438 may be constructed of rubber or another flexible material. As such, the dust seal 438 can be press fit under the shoulder 718 to install the dust seal 438. The dust seal 438 may be pulled out (e.g., by pulling on the tab 442) from the shoulder 718 and removed to access the circuit board 426, the battery 428, and/or other component(s) in the housing 302.

In the illustrated example, the pressure sensor 444 extends at least partially into an opening 720 between the chamber 710 and the second end 706 of the housing 302. As such, the pressure sensor 444 is exposed to the pneumatic fluid in the pneumatic chamber 228. The second bracket 450 is disposed over the pressure sensor 444 to react to pressure loads on the pressure sensor 444. The seal 446 is disposed in the opening 720 between the pressure sensor 444 and the housing 302 to prevent leakage of pneumatic fluid into the chamber 710. In this example, the pressure sensor 444 extends beyond the second end 706 of the housing 302. However, in other examples, the pressure sensor 444 may not extend beyond the second end 706 of the housing 302.

In the illustrated example, the housing 302 has a passageway 722 defined through the housing 302 between a first opening 724 in the first end 704 of the housing 302 and a second opening 726 in the second end 706 of the housing 302. The valve 416 is disposed in the passageway 722 and extends outward from the first opening 724. In this example, the valve body 418 is screwed into the housing 302 and a seal 728 is disposed between the housing 302 and the valve body 418 in the passageway 722. In other examples, the valve body 418 may be coupled to the housing 302 via other techniques (e.g., friction fit, adhesives, etc.). As shown in FIG. 7, the valve body 418 extends through the opening 440 in the dust seal 438. The valve 416 is used to control the flow of pneumatic fluid through the passageway 722 and, thus, can be used to add or remove pneumatic fluid to/from the pneumatic chamber 228. In the illustrated example, a bottom side 727 of the dust seal 438 has a recess 729. The top edge 436 of the circuit board 426 extends into the recess 729. In some examples, this enables certain components on the circuit board 426 to be disposed above a plane defined by the top end 216 of the first upper leg 204, as disclosed in further detail in connection with FIG. 11.

As shown in FIG. 7, the passageway 722 and, thus, the valve 416 are aligned along an axis 730. The axis 730 is parallel to and offset from the central axis 708 of the housing 302 (and the longitudinal axis of the first upper leg 204) by a distance D. This enables the chamber 710 for the circuit board 426 and the battery 428 to be more centrally located, where the housing 302 is wider. In particular, as shown in FIG. 7, the chamber 710 intersects the central axis 708 of the housing 302. This enables the chamber 710 to be sized larger (wider) to contain the component(s) of the electronic monitoring device 138. Further, as shown in FIG. 7, the circuit board 426 and the battery 428 can be disposed along or close to the central axis 708 of the housing 302. This location is the widest dimension (diameter) of the housing 302. As such, the circuit board 426 can be sized wider (into and out of the figure) and therefore less deep. This reduces the overall length or depth required of the housing 302.

As shown in FIG. 7, the wall 404 extends from the first end 704 of the housing 302. In the illustrated example, the cover 412 has a wall 732 with external threads 734. The external threads 734 mate with the internal threads 414 of the wall 404 to threadably couple the cover 412 to the wall 404. Thus, the cover 412 can be screwed onto or off of the housing 302.

In some examples, it may be desired to change (e.g., reduce) the volume of the pneumatic chamber 228 for specific air spring tuning. Therefore, in some examples, the electronic monitoring device 138 may include one or more adjustment devices to change the volume of the pneumatic chamber 228. For example, as shown in FIG. 7, the electronic monitoring device 138 includes an adjustment device 736 coupled to the housing 302 and disposed in the pneumatic chamber 228. The adjustment device 736 consumes space in the pneumatic chamber 228, thereby reducing the overall volume of the pneumatic chamber 228. The adjustment device 736 includes openings 738 to enable the pneumatic fluid in the pneumatic chamber 228 to fill an area 740 between the second end 706 of the housing 302 and the adjustment device 736, so that the pressure sensor 444 is still exposed to the fluid in the pneumatic chamber 228.

In this example, the adjustment device 736 is threadably coupled to the housing 302. For example, the housing 302 has a wall 742 extending from the second end 706 of the housing 302. The wall 742 has internal threads 744. The adjustment device 736 has external threads 746 that mate with the internal threads 744 on the housing 302. In other examples, the adjustment device 736 may be coupled to the housing 302 via other chemical and/or mechanical fastening techniques, such as interference fit, friction fit, welding, soldering, adhesives, magnets, etc. The adjustment device 736 may be coupled to the housing 302 before the housing 302 is inserted into the first upper leg 204.

In some examples, the adjustment device 736 is interchangeable with other adjustment devices. For example, the housing 302 may be removed from the first upper leg 204 and the adjustment device 736 may be replaced with a larger or smaller sized adjustment device depending on the desired volume reduction/increase. Additionally or alternatively, one or more additional adjustment devices may be coupled to the adjustment device 736. For example, as shown in FIG. 7, the adjustment device 736 has a wall 748 with internal threads 750. The internal threads 750 are sized to mate with the external threads 746. Therefore, another adjustment device, being the same size and shape as the adjustment device 736, can be screwed into the adjustment device 736. Multiple adjustment devices can be screwed together in a stacked manner. Thus, only one size/shape adjustment device may need to be manufactured, and then multiple ones of the adjustment devices can be stacked together depending on the desired volume reduction/increase.

Figure 8:
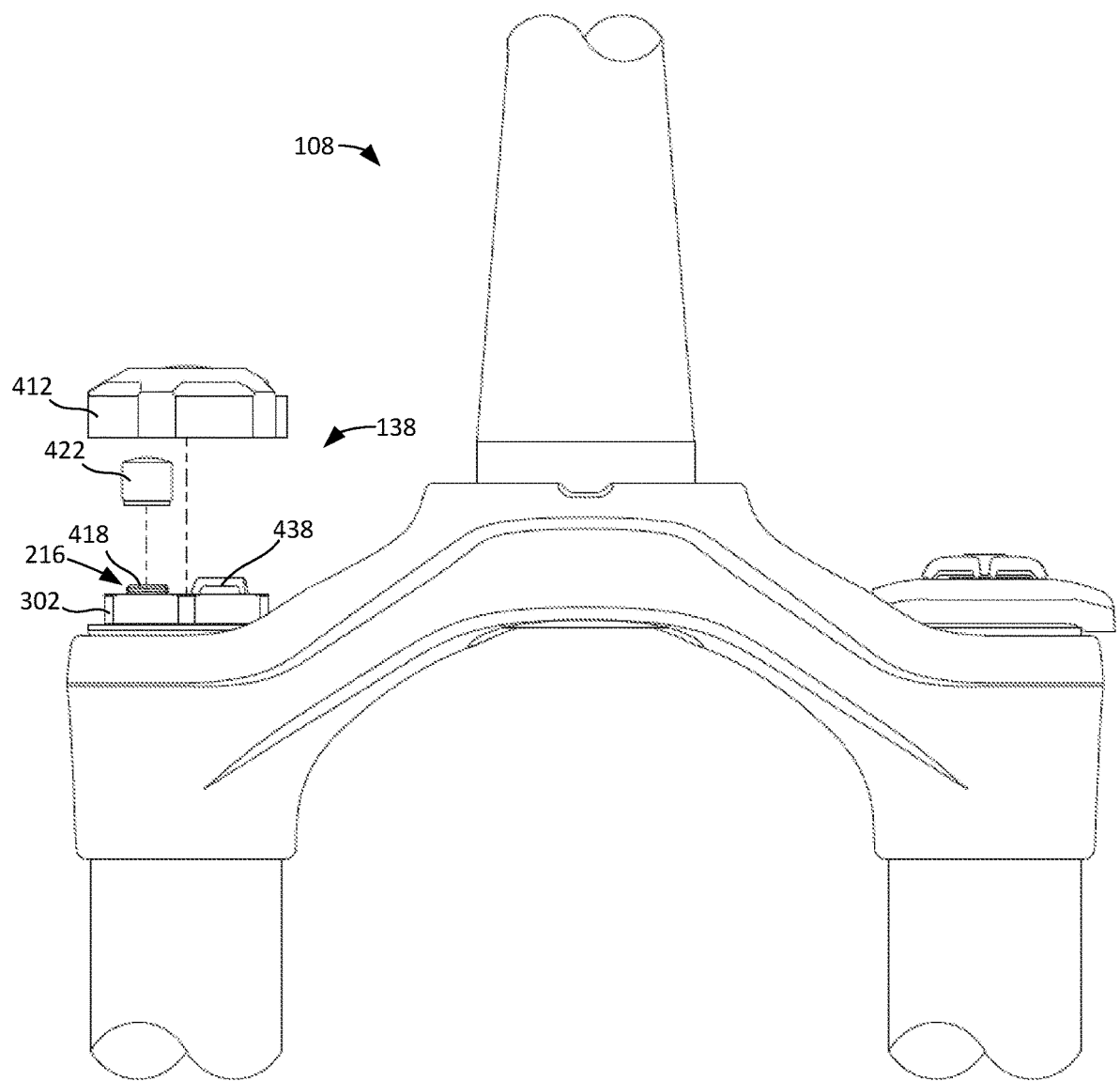
FIG. 8 is a front view of the example front fork and the example electronic monitoring device of FIG. 2 showing an example cover and an example valve cap separated from an example housing of the example electronic monitoring device.

FIG. 8 is a front view of the front fork 108 with the electronic monitoring device 138. If a user desires to change the amount of fluid (e.g., air) in the pneumatic chamber 228 (FIG. 2), the user may remove the cover 412 from the housing 302 (e.g., by unscrewing the cover 412) and remove the valve cap 422 from the valve body 418 (e.g., by unscrewing the valve cap 422), as shown in FIG. 8. A user can open the valve 416 (e.g., by pressing on the core 420 (FIG. 4) to release pneumatic fluid from the pneumatic chamber 228. A user can also open the valve 416 (e.g., by contact with a nozzle on a pump hose) and pump fluid through the valve 416 and into the pneumatic chamber 228. The dust seal 438 does not need to be removed to operate the valve 416. After the desired pressure is reached, the user can reattach the valve cap 422 and the cover 412. Thus, the electronic monitoring device 138 does not need to be removed from the front fork 108 to adjust the pressure in the pneumatic chamber 228.

Figure 9:
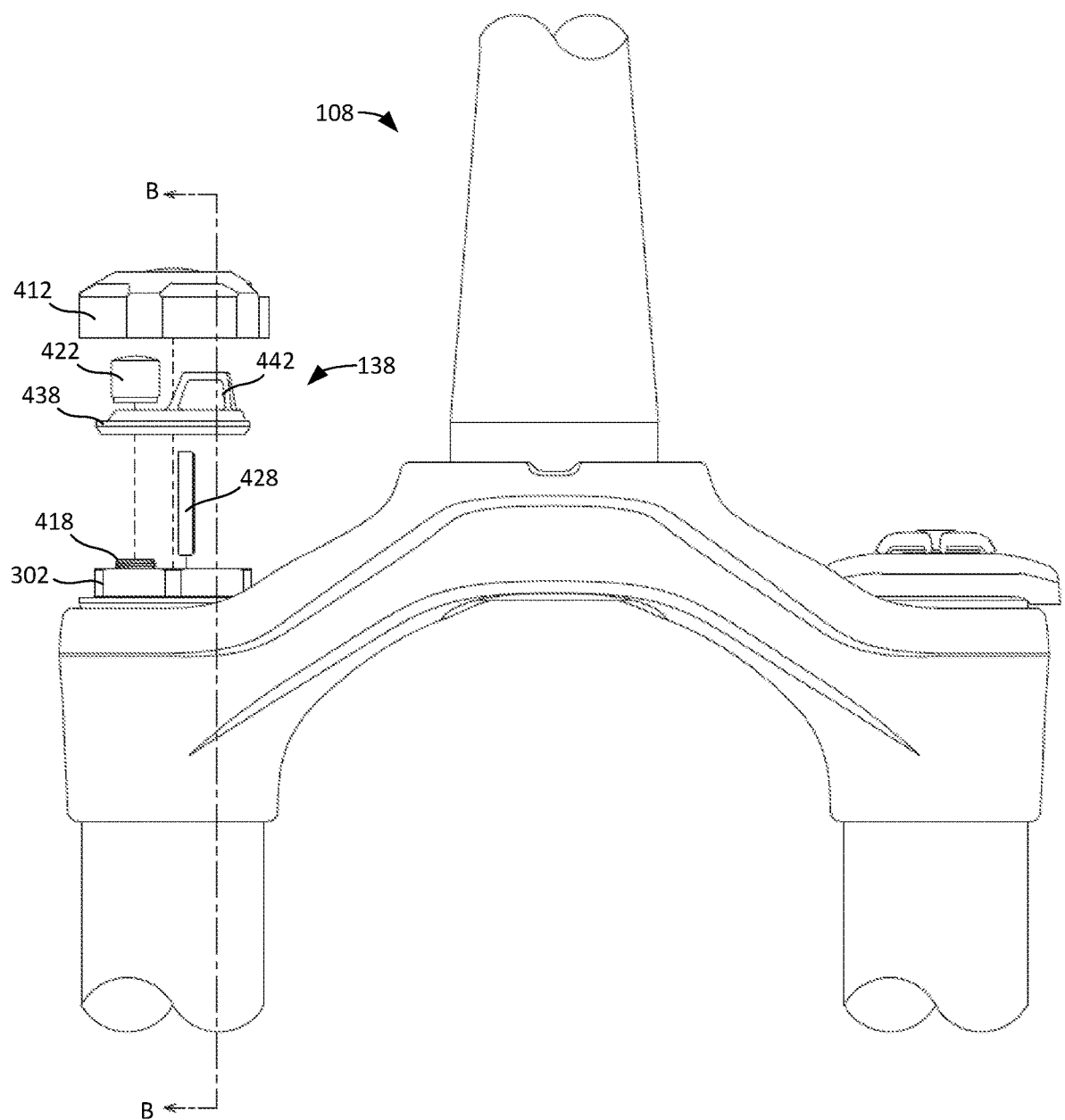
FIG. 9 is a front view of the example front fork and the example electronic monitoring device of FIG. 2 showing an example cover, an example valve cap, an example dust seal, and an example battery separated from an example housing of the example electronic monitoring device.

FIG. 9 is another front view of the front fork 108 with the electronic monitoring device 138. If a user desires to remove the battery 428, for example, the user may remove the cover 412 from the housing 302 (e.g., by unscrewing the cover 412), remove the valve cap 422 from the valve body 418 (e.g., by unscrewing the valve cap 422), remove the dust seal 438 from the housing 302, and then remove the battery 428 from the housing 302, as shown in FIG. 9. The dust seal 438 includes the tab 442, which enables a user to easily grip the dust seal 438 when removing the dust seal 438. The battery 428 can be charged and reinstalled or can be replaced with another battery. Once a battery is installed, for example, the user can reinstall the dust seal 438, and then reattach the valve cap 422 and the cover 412.

Figure 10:
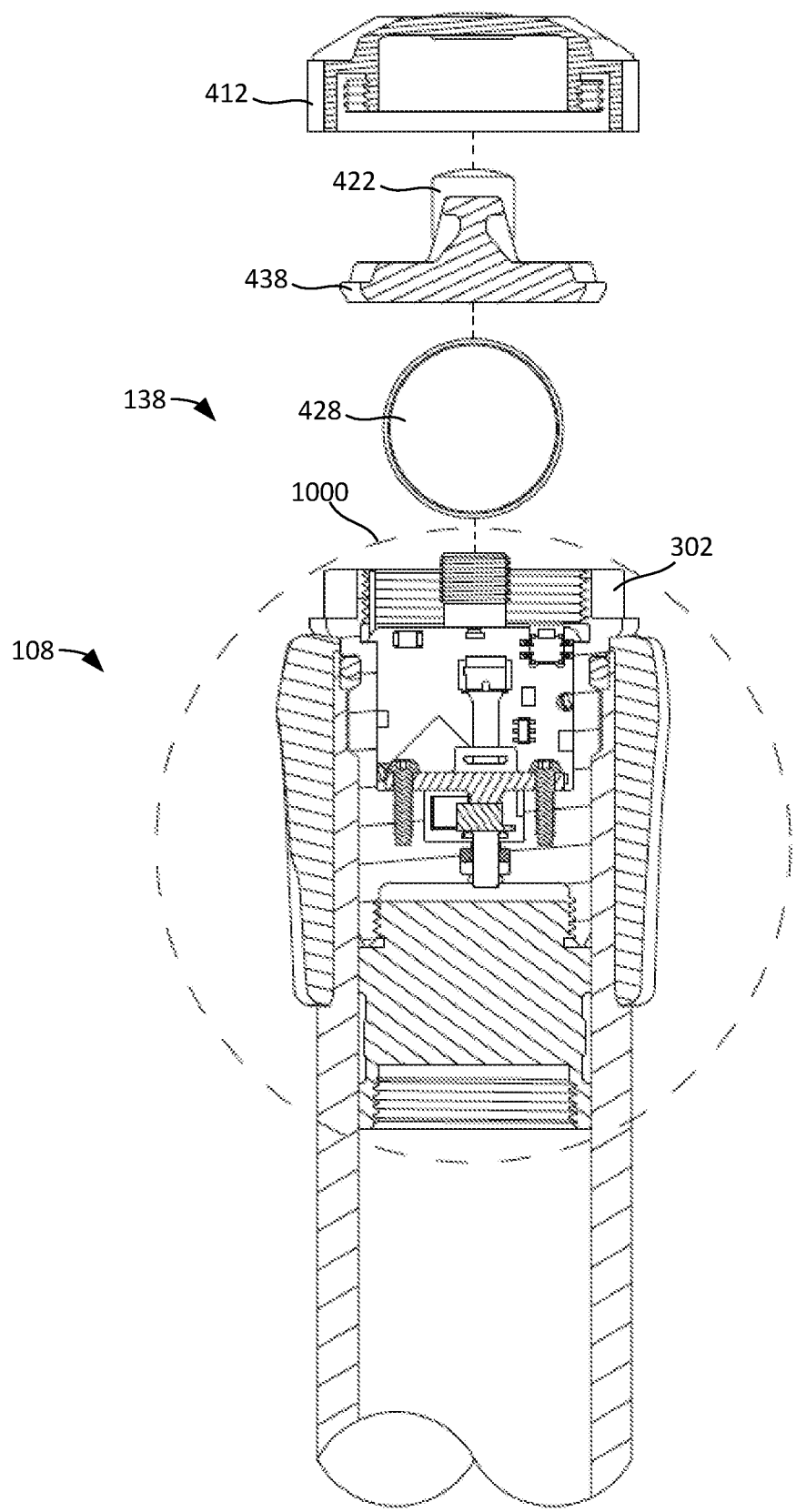
FIG. 10 is a cross-sectional view of the example front fork and the example electronic monitoring device taken along line B-B of FIG. 9.

FIG. 10 is a cross-sectional view of the front fork 108 and the electronic monitoring device 138 taken along line B-B of FIG. 9. The cover 412, the valve cap 422, the dust seal 438, and the battery 428 are shown as separated from the housing 302.

Figure 11:
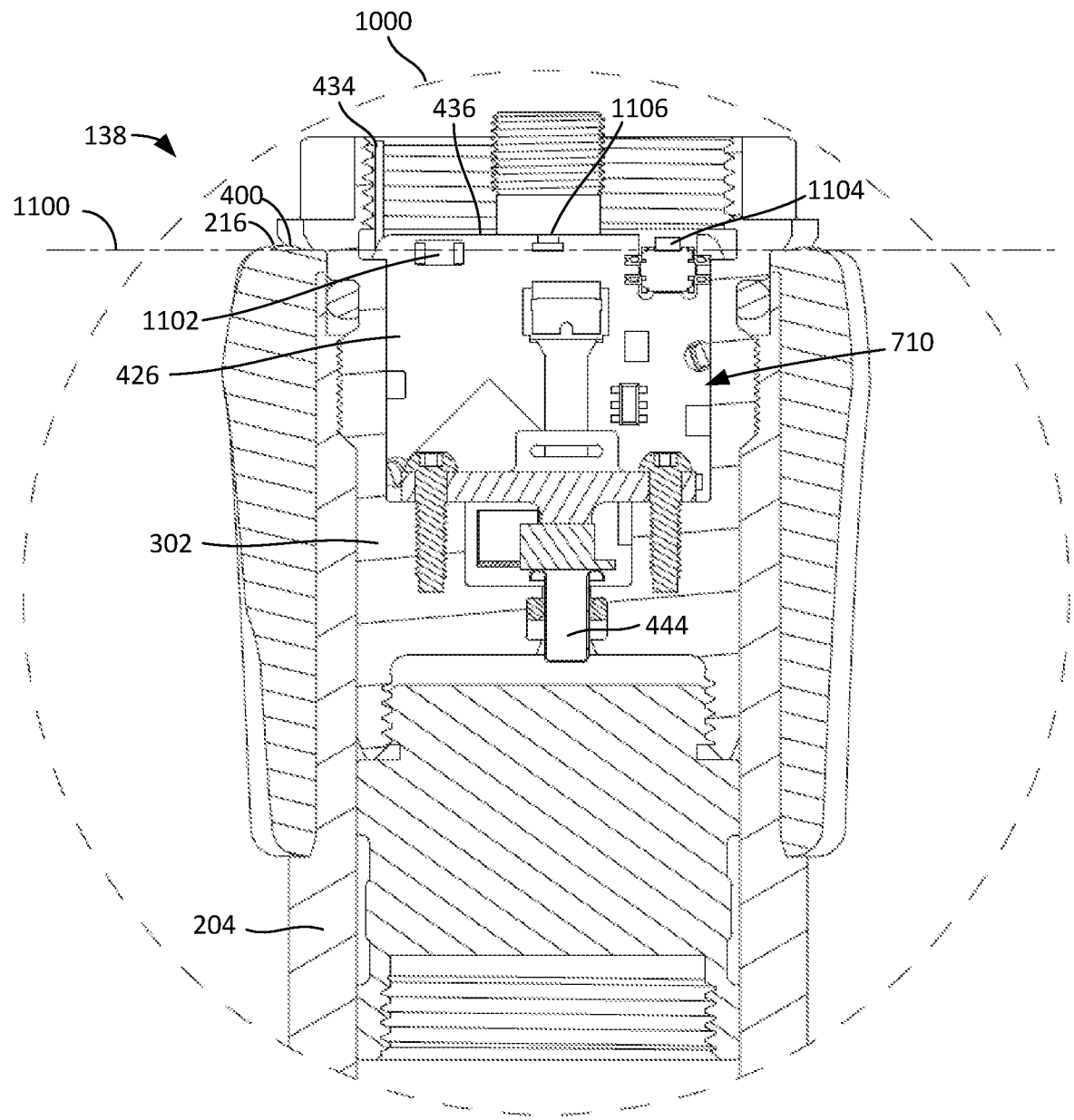
FIG. 11 is an enlarged view of the callout in FIG. 10.

FIG. 11 is an enlarged view of the callout 1000 in FIG. 10. As shown in FIG. 11, the release tab 434 of the battery holder 430 (FIG. 4) extends upward and out of the chamber 710. Once the dust seal 438 (FIG. 10) is removed, the release tab 434 can be pulled to help extract the battery 428 (FIG. 10) from the battery holder 430.

As disclosed above, when the housing 302 is fully screwed into the first upper leg 204, the shoulder 400 engages the top end 216 of the first upper leg 204. A plane 1100 (which may be referred to as a housing seating plane) is defined by the top end 216 of the first upper leg 204. The circuit board 426 is disposed in the chamber 710 formed in the housing 302. In the illustrated example, the electronic monitoring device 138 includes a wireless antenna or communicator 1102 to transmit signals (e.g., data representative of pressure measurements) to one or more devices, such as the mobile device 140 (FIG. 1). In the illustrated example, the wireless communicator 1102 is disposed on and/or otherwise coupled to the circuit board 426 at or near the top edge 436 of the circuit board 426. At least a portion of the wireless communicator 1102 is to be positioned above the plane 1100. In other words, the wireless communicator 1102 is at least partially disposed on an opposite side of the plane 1100 relative to the pressure sensor 444 and other electrical components in the housing 302. This reduces the amount of obstruction or interference caused by the first upper leg 204 compared to known devices where the wireless communicator is disposed further down in the suspension component. In this example, the wireless communicator 1102 intersects the plane 1100. In other examples, the wireless communicator may be separated by a specific distance from (above) the plane 1100. The location of the wireless communicator 1102 may be determined by various parameters, such as by the location of the shoulder 400 on the housing 302, the location of the circuit board 426 within the chamber 710, and/or the location of the wireless communicator 1102 on the circuit board 426. Any of these parameters can be modified to change the location of the wireless communicator relative to the plane 1100. While in this example the wireless communicator 1102 is coupled to the circuit board 426, in other examples, the wireless communicator 1102 may not be coupled to circuit board 426. Instead, the wireless communicator 1102 may be coupled directly to the housing 302.

In some examples, the electronic monitoring device 138 includes a switch to turn the electronic monitoring device on or off. For example, as shown in FIG. 11, the electronic monitoring device 138 includes a switch 1104. In this example, the switch 1104 is coupled to the circuit board 426 at or near the top edge 436 of the circuit board 426. A user may activate the switch (e.g., by pressing the switch) to turn the electronic monitoring device 138 on or off. In other examples, the switch 1104 may be disposed in other locations. In some examples, the electronic monitoring device 138 includes an indicator to indicate whether the electronic monitoring device 138 is active. For example, as shown in FIG. 11, the electronic monitoring device 138 includes a light 1106 (e.g., an LED light). In this example, the light 1106 is coupled to the circuit board 426 at or near the top edge 436 of the circuit board 426. The light 1106 may illuminate when the electronic monitoring device 138 is activate and the battery 428 (FIG. 4) has sufficient power. If the light 1106 is not illuminated, it may indicate to the user the electronic monitoring device 138 is off or does not have sufficient power. In other examples, other types of indicators may be used (e.g., an audible alert, a vibration, etc.) in addition to or as an alternative to the light 1106.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electronic monitoring device for a suspension component of a bicycle, the electronic monitoring device comprising:
   a housing defining a chamber, the housing to be coupled to the suspension component;
   a circuit board disposed in the chamber;
   a sensor electrically coupled to the circuit board, the sensor to measure a characteristic of the suspension component; and
   a battery holder supported by the circuit board.

2. The electronic monitoring device of claim 1, wherein the battery holder is a coin cell battery holder.

3. The electronic monitoring device of claim 1, wherein the battery holder is orientated such that a central axis of the battery holder is perpendicular to a central axis of the housing.

4. The electronic monitoring device of claim 1, wherein the chamber intersects a central axis of the housing.

5. The electronic monitoring device of claim 1, wherein the sensor is a pressure sensor.

6. The electronic monitoring device of claim 1, wherein the chamber is accessible through an opening formed in an end of the housing.

7. The electronic monitoring device of claim 6, further including a release tab coupled to the battery holder, the release tab extending outward from the chamber to enable a user to pull the release tab to remove a battery from the battery holder.

8. The electronic monitoring device of claim 6, further including a dust seal disposed over the end of the housing to substantially seal the chamber.

9. The electronic monitoring device of claim 8, wherein the dust seal includes a tab to be gripped by a user.

10. An electronic monitoring device for a suspension component of a bicycle, the electronic monitoring device comprising:
    a housing to be coupled to the suspension component, a passageway defined through the housing;
    a circuit board disposed in the housing;
    a sensor electrically coupled to the circuit board, the sensor to measure a characteristic of the suspension component; and
    a valve disposed in the passageway to control a flow of fluid into or out of the suspension component, the valve aligned along an axis that is offset from a central axis of the housing.

11. The electronic monitoring device of claim 10, wherein the valve is a Schrader valve.

12. The electronic monitoring device of claim 10, wherein the passageway is defined between a first end of the housing and a second end of the housing opposite the first end, further including a dust seal disposed over the first end of the housing, the dust seal having an opening, the valve extending through the opening in the dust seal.

13. The electronic monitoring device of claim 12, wherein a bottom side of the dust seal has a recess, a top edge of the circuit board extending into the recess.

14. The electronic monitoring device of claim 10, wherein the housing includes a wall extending from and end of the housing, further including a cover threadably coupled to the wall.

15. The electronic monitoring device of claim 14, further including a valve cap coupled to the valve.

16. A suspension component for a bicycle, the suspension component comprising:
- a first tube and a second tube configured in a telescopic arrangement, the first tube having an opening formed in an end of the first tube;
- a spring including a pneumatic chamber defined in the first tube and containing a mass of a pneumatic fluid configured to resist compression of the telescopic arrangement; and
- an electronic monitoring device disposed in the opening, the electronic monitoring device including:
  - a housing;
  - a circuit board disposed in the housing;
  - a sensor electrically coupled to the circuit board, the sensor to measure a characteristic of the spring; and
  - a wireless communicator coupled onto a portion of the circuit board, the portion of the circuit board containing the wireless communicator being at least partially disposed on an opposite side of a plane defined by the end of the first tube relative to the sensor.

17. The suspension component of claim 16, wherein the wireless communicator intersects the plane.

18. The suspension component of claim 16, wherein the electronic monitoring device includes a valve, the valve aligned along an axis that is parallel to and offset from a longitudinal axis of the first tube.

19. The suspension component of claim 16, further including an adjustment device coupled to the housing of the electronic monitoring device and disposed in the pneumatic chamber.

20. The suspension component of claim 19, wherein the adjustment device is threadably coupled to the housing.

* * * * *